(12) United States Patent  (10) Patent No.: US 8,119,198 B2
Muradov  (45) Date of Patent: Feb. 21, 2012

(54) THREE-DIMENSIONAL CARBON FIBERS AND METHOD AND APPARATUS FOR THEIR PRODUCTION

(75) Inventor: Nazim Z. Muradov, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 121 days.

(21) Appl. No.: 12/818,529

(22) Filed: Jun. 18, 2010

(65) Prior Publication Data

US 2010/0255197 A1 Oct. 7, 2010

Related U.S. Application Data

(62) Division of application No. 10/896,312, filed on Jul. 20, 2004, now Pat. No. 7,816,004, which is a division of application No. 10/338,436, filed on Jan. 8, 2003, now Pat. No. 6,787,229.

(60) Provisional application No. 60/346,548, filed on Jan. 8, 2002, provisional application No. 60/346,580, filed on Jan. 8, 2002.

(51) Int. Cl.
   *C23C 16/00* (2006.01)
(52) U.S. Cl. .................. 427/249.1; 427/248.1
(58) Field of Classification Search .............. 427/248.1, 427/248.19
   See application file for complete search history.

(56) References Cited

U.S. PATENT DOCUMENTS

| | | | |
|---|---|---|---|
| 4,572,813 A | 2/1986 | Arakawa | |
| 4,663,230 A | 5/1987 | Tennent | |
| 5,149,584 A | 9/1992 | Baker | |
| 5,165,909 A | 11/1992 | Tennent | |
| 5,187,021 A | 2/1993 | Vydra | |
| 5,217,657 A | 6/1993 | Engle | |
| 5,227,142 A | 7/1993 | Murai | |
| 5,322,711 A | 6/1994 | Gabor | |
| 5,374,415 A | 12/1994 | Alig | |
| 5,405,654 A | 4/1995 | Gabor | |
| 5,413,866 A * | 5/1995 | Baker et al. | ................ 423/447.2 |
| 5,547,512 A | 8/1996 | Gabor | |
| 5,618,875 A * | 4/1997 | Baker et al. | ................... 524/495 |
| 5,650,370 A | 7/1997 | Tennent | |
| 5,690,997 A | 11/1997 | Grow | |
| 6,159,538 A | 12/2000 | Rodriguez | |
| 6,235,674 B1 | 5/2001 | Tennent | |
| 6,489,026 B1 | 12/2002 | Nishimura | |
| 7,122,132 B2 | 10/2006 | Morita | |

* cited by examiner

*Primary Examiner* — Kelly M Gambetta
(74) *Attorney, Agent, or Firm* — Brian S. Steinberger; Joyce P. Morlin; Law Offices of Brian S. Steinberger, P.A.

(57) ABSTRACT

This invention relates to novel three-dimensional (3D) carbon fibers which are original (or primary) carbon fibers (OCF) with secondary carbon filaments (SCF) grown thereon, and, if desired, tertiary carbon filaments (TCF) are grown from the surface of SCF forming a filamentous carbon network with high surface area. The methods and apparatus are provided for growing SCF on the OCF by thermal decomposition of carbonaceous gases (CG) over the hot surface of the OCF without use of metal-based catalysts. The thickness and length of SCF can be controlled by varying operational conditions of the process, e.g., the nature of CG, temperature, residence time, etc. The optional activation step enables one to produce 3D activated carbon fibers with high surface area. The method and apparatus are provided for growing TCF on the SCF by thermal decomposition of carbonaceous gases over the hot surface of the SCF using metal catalyst particles.

21 Claims, 13 Drawing Sheets

THREE-DIMENSIONAL CARBON FIBERS AND METHOD AND APPARATUS FOR THEIR PRODUCTION

FIELD OF THE INVENTION

This invention relates to novel three-dimensional (3D) carbon fibers and to the methods and apparatus for their production and this Application is a divisional of application Ser. No.: 10/896,312 filed Jul. 20, 2004, now U.S. Pat. No. 7,816,004, which is a divisional of application Ser. No. 10/338,436, filed Jan. 8, 2003, now U.S. Pat. No. 6,787,229 and claims the rights arising out of the earlier filed U.S. Provisional Applications Nos. 60/346,548 filed Jan. 8, 2002 and 60/346,580 filed Jan. 8, 2002.

STATEMENT REGARDING FEDERALLY SPONSORED RESEARCH OR DEVELOPMENT

The subject invention was made with government support under U.S. Department of Energy (DOE), Contract No. DEFC3699GO10456, Grant 10046. The government has certain rights in this invention.

BACKGROUND OF THE INVENTION

Carbon fibers are the main high strength reinforcing material used in fabrication of high performance composite materials. Strength-to-weight properties of carbon fiber reinforced composites (CFC) are superior to any other materials that are bringing about the revolution in many industrial areas such as construction, aviation, space, etc. In general, carbon-based composite materials comprise carbon fibers and a matrix. Different materials, such as polymers, carbons, ceramic, metals, glass, etc. could be used as a matrix in composite materials. The matrix must have the ability to transfer stress between fibers so that all the fibers used are effective in bearing the load. However one of the major problems associated with CFC materials relates to the weak interlaminar strength and bonding between the carbon fiber and matrix (especially an inorganic matrix). This could potentially lead to failure due to delaminating of the plies and/or fiber pull-out in CFCs.

Numerous attempts have been made to improve bonding between a fiber and a matrix consisting mostly of chemical and physical modifications to the surface of the fiber [L. Peebles, Carbon Fibers: Formation, Structure and Properties. CRC Press, Boca Raton, 1994]. For example, according to one approach the fiber surface was etched by oxidizing agents [P. Ehrburger, In Carbon, Fibers, Filaments and Composites, (Ed. J. Figueiredo et al.) Kluwer Academic Publ., Dotrecht (1989)]. The advantages were two-fold: firstly, the surface of fiber was roughened and increased, and, secondly, polar functional groups were introduced, which also enhanced the adhesion of fiber to the matrix. More recently, electrochemical etching [C. Kozlowski, P. Sherwood, Carbon, v. 24, 357 (1986)] and plasma [L. Drzal, M. Rich, P. Lloyd, J. Adhesion, v. 16, p. 1 (1982)] etching, as well as reaction with atomic oxygen [P. Pattabiraman, N. Rodrigues, B. Jang, R. Baker, Carbon, v. 28, p. 867 (1990)] have also been used to increase bonding between the fibers and the matrix. These methods, however, could potentially lead to extensive damage and weakening of the structure [P. Pattabiraman, N. Rodrigues, B. Jang, R. Baker, Carbon, v. 28, p. 867 (1990)]. In another approach, silicon carbide (SiC) whiskers were grown from the surface of a carbon fiber [J. Milewski et. al., U.S. Pat. No. 3,580,731 (1971)]. That process involved chemical vapor deposition (CVD) of SiC at temperatures above 1400° C. This method, however, suffers from a number of shortcomings, related mostly to the differences in the density and the thermal expansion coefficients of SiC and carbon fiber, and difficulty of handling such an abrasive material.

An attempt to produce carbon fiber structures suitable for use in high performance composites by growing carbon filaments on the surface of primary carbon fibers (PCF) via a catalyzed CVD technique was reported [R. Baker et al, U.S. Pat. No. 5,413,866 (1995), and W. Downs and R. Baker, Carbon, v. 19, No. 8, pp. 1173-1179 (1991)]. The presence of carbon filaments enhances the interfacial bonding between the fiber and the matrix, which greatly reduces the problems associated with the delaminating of the composite. The concept is based on decomposition of selected hydrocarbons, preferably, ethylene (in a mixture with hydrogen), on the hot metal surfaces, preferably, Ni—Cu alloy (70:30). During this reaction, growth of carbon filaments are influenced by several factors including: (a) the catalyst particle determines the morphology, the diameter, and the degree of crystallinity of graphitic units in the filament; and (b) during the filaments growth, the hydrocarbon is adsorbed and decomposed on the metal catalyst particle, followed by the diffusion of carbon species through the catalyst particle and the precipitation at the back of it, producing the filament structure. In general, the catalyst particle is located at the growing end of the filament, and is carried away from the surface of the support. Catalytic filament growth ceases when the leading face of the catalyst particle is encapsulated by a layer of carbon, which prevents further hydrocarbon decomposition. The filaments growth via catalyzed CVD occurs at 600° C. with the typical diameters of filaments varying from 5 nm to 1000 nm (or 1 µm), and the lengths from 5 to 100 µm. The method suffers from the following disadvantages:

1) the method is very complex and multi-step as it includes—(i) the impregnation of PCF by aqueous solutions of mixed metal salts, (ii) the calcination in an oxidizing environment (air) to convert metal salts to metal oxides, (iii) reduction of metals oxides into metals using hydrogen-helium mixture, (iv) decomposition of ethylene (in a 50-50 mixture with hydrogen) over metal catalyst particles;
2) during the impregnation stage, the catalyst tends to accumulate in the crevices between the adjacent fibers, which leads to the predominant growth of filaments in these areas, and, as a result, to a non-uniform distribution of filaments;
3) the filaments are relatively thin (<1 µm) and predominantly curly which would result in a relatively weak micromechanical interaction with the matrix, particularly, metal and ceramic;
4) the method does not provide means for producing a protective coating for PCF; and,
5) due to intrinsic complexity of the method, it would be very difficult to arrange a continuous process.

A similar chemical vapor deposition technique was used by the authors [P. McAllister, E. Wolf, Carbon, v. 30, No. 2, pp. 189-200 (1992)] to perform catalytic chemical vapor infiltration as the means of improvement of carbon-carbon composites. The authors grew carbon filaments on carbon fibers using Ni-catalyst particles and propylene as a source of carbon for the filaments. The method suffered from the same drawbacks recited as numbers 1-5 in the foregoing and additional drawbacks.

It is apparent from the above discussion that the bonding between the carbon fiber and the matrix in most cases is improved via increase in the micromechanical interaction between the fiber and the matrix which is directly proportional to the interfacial surface area. All the prior art systems offer rather limited capabilities for increasing the interfacial surface area between the carbon fiber and the matrix. While the existing methods for increasing the bonding between the carbon fibers and the matrix do improve the interlaminar strength of composite materials, there is a need for novel carbon fiber materials with the increased surface area and improved micromechanical interaction with the matrix. Furthermore, the 3D carbon fibers with the increased surface area can find a wide application in other areas, such as, adsorbents, catalyst supports, fuel cells, capacitors, medicine, refrigeration, environmental control and others.

BRIEF SUMMARY OF THE INVENTION

It is a primary objective of the invention to provide novel high performance 3D carbon fibers comprised of original (or primary) carbon fibers (OCF) with the secondary carbon filaments (SCF) grown there from, and the tertiary carbon filaments (TCF) grown from the surface of SCF forming three-dimensional high surface area carbon structure.

Another objective of the invention is to develop novel methods and apparatus for the production of 3D carbon fibers by means of thermal decomposition of carbonaceous gases (CG) (or vapors) in an oxidant-free atmosphere over the heated surface of OCF and, if necessary, SCF.

Another object of the invention is to develop a method and apparatus for the growth of SCF on the surface of OCF by thermal decomposition of CG including, but not limited, to saturated, unsaturated and aromatic hydrocarbons, over the surface of resistively heated OCF (or other means of heating).

A further object of the invention is to develop a method and apparatus for growing SCF of different thickness, from 100 nm to 100 μm, and length, from 1 μm to 1 cm, by varying the operational conditions of the process, e.g., the nature of CG used, additives to CG, temperature of OCF and temperature gradient in the reactor, partial pressure, CG residence time, etc.

Another object of the invention is to develop a method and apparatus for the growth of tertiary carbon filaments (TCF) on the surface of heated SCF by thermal decomposition of CG including, but not limited, to saturated, unsaturated and aromatic hydrocarbons and carbon monoxide, in the presence of metal catalyst particles.

An additional object of the invention is to cover the surface of OCF with the protective carbon (pyrocarbon) coating to prevent oxidative, corrosive or other possible chemical or mechanical damages to the OCF.

Another object of the invention is to further increase the surface area of 3D carbon fibers by the treatment of the surface of OCF and SCF with activating agents (e.g., steam, $CO_2$ and others).

In preferred product embodiments of the invention, the structure of 3D carbon fibers is OCF modified with surface grown predominantly straight SCF and if desired curly TCF grown on the SCF surface. The former embodiment is better described as three-dimensional (3D) carbon fibers comprising secondary carbon filaments (SCF) grown on the surface of the original carbon fibers (OCF) and characterized by a catalytic metal weight content of less than approximately 100 parts per million. These (SCF) are from approximately 100 nm to approximately 100 μm thickness and have lengths of from approximately 1 μm to approximately 1 cm. The latter embodiment is better described as three-dimensional 3D carbon fibers comprising tertiary carbon filaments (TCF) grown as branches on the surface of the secondary carbon filaments (SCF) and characterized by a catalytic metal weight content in excess of approximately 0.1 weight percent. The (TCF) are from approximately 10 nm to approximately 1 μm thickness and have lengths of from approximately 1 μm to approximately 100 μm.

In one of the preferred method embodiments of the present invention, 3D carbon fibers were prepared by thermally decomposing a carbonaceous gas in an oxidant-free atmosphere over the surface of heated original carbon fibers (OCF); and, recovering OCF with secondary carbon fibers (SCF) on its surfaces thereby realizing three-dimensional (3D) carbon fibers which for increased area can be activated by exposure to steam or $CO_2$.

In a second preferred method embodiment, the SCF modified OCF has deposited active metal catalyst particles on the surfaces of the recovered secondary carbon fibers (SCF) and thereafter subjected to a carbonaceous gas thermally decomposed in an oxidant-free atmosphere over the surface of the heated SCF whereby tertiary carbon filaments (TCF) are grown on the SCF surfaces.

In the preferred apparatus embodiment, the apparatus for producing three-dimensional (3D) carbon fibers comprises: a first chamber for growing secondary carbon filament (SCF); means for supplying original carbon filament (OCF) into said first chamber; means for introducing carbonaceous gas (CG) into and out of said first chamber; means for heating said OCF to a decomposition temperature for said CG; means for controlling the temperature and the time of exposure of said heated OCF to said CG within said chamber until the desired SCF growth is realized and, means for recovery of said SCF is provided.

Further objects and advantages of this invention will be apparent from the following detailed descriptions of presently preferred embodiments which are illustrated schematically in the accompanying drawings.

DESCRIPTION OF THE PREFERRED EMBODIMENTS

Before explaining the disclosed embodiments of the present invention in detail, it is to be understood that the invention is not limited in its application to the details of the particular arrangements shown herein since the invention is capable of other embodiments. Also, the terminology used herein is for the purpose of description and not of limitation.

It would be useful to discuss the meanings of some words used herein and their applications before discussing the novel preparation of the three-dimensional (3D) carbon fibers including:

carbonaceous gases (CG)—ones that thermally decompose into an atmosphere from which carbon deposits onto adjacent surfaces;

chemical vapor deposition (CVD)—deposition of carbon in the form of filaments (or other form) on the substrate surface provoked by thermal decomposition of carbonaceous gases;

3D carbon fibers—carbon structure comprised of primary (or original) carbon fibers with the secondary carbon filaments (SCF) grown therefrom, and, if desired, the tertiary carbon filaments grown from the surface of SCF;

original carbon fiber (OCF)—commercial carbon fibers used for the production of 3D carbon fibers;

oxidant-free atmosphere—the medium that does not contain compounds that could potentially oxidize CG or OCF;

pyrocarbon—surface coating obtained from the thermal decomposition of unique carbonaceous gases in an oxidant-free atmosphere over the heated surface of OCF;

secondary carbon filaments (SCF)—carbon filaments grown on the surface of the original (or primary) carbon fiber as a result of the process of the invention described herein;

tertiary carbon filaments (TCF)—carbon filaments grown on the surface of the secondary carbon filaments as a result of the process of the invention described herein; and, scanning electron microscopy (SEM)—the method used to study the surface topography of solid materials in nanometer scale.

Figure 1:
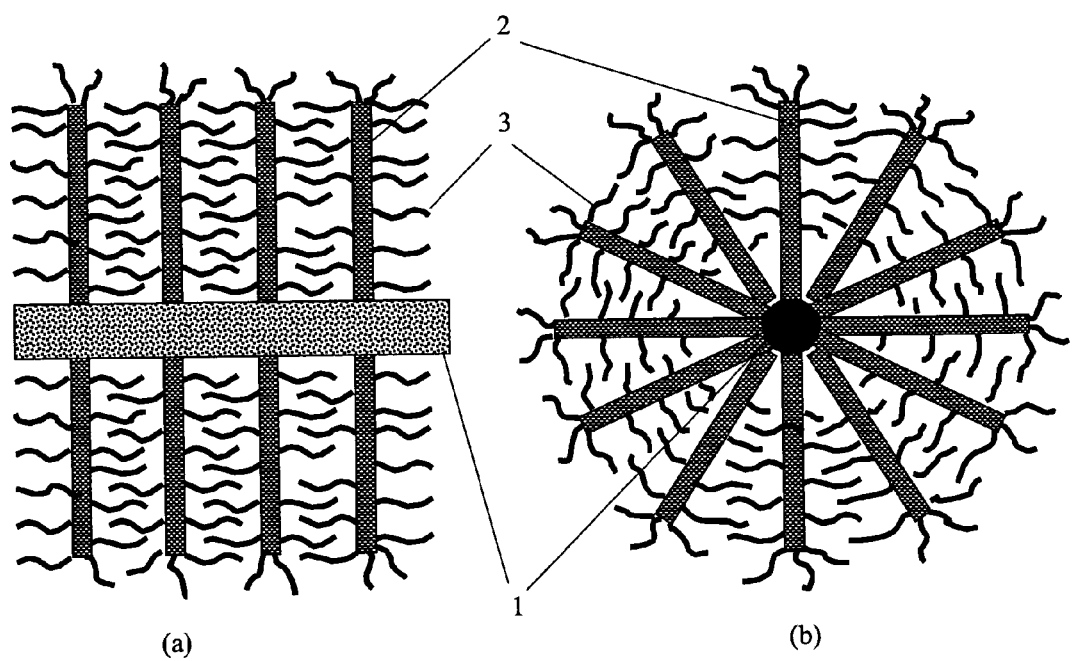
FIG. 1(a) depicts a representative sketch of a longitudinal cross-sectional view of a 3D carbon fiber.
FIG. 1(b) is a lateral cross-sectional view of a 3D carbon fiber.

This invention provides novel three-dimensional carbon fiber structures comprising an original (or primary) carbon fiber covered with the network of secondary and tertiary carbon filaments. Refer now to the Figures. FIG. 1 (a) depicts a sketchy representation of a longitudinal cross-sectional view of 3D carbon fiber with the predominantly straight secondary carbon filament (SCF) 2 and the curly tertiary carbon filament (TCF) 3 grown on the surface of the OCF 1. FIG. 1(b) is a lateral cross-sectional view of the 3D carbon fibers.

The method of the invention is based on the thermal decomposition of unique carbonaceous gases (CG), preferably, saturated and unsaturated hydrocarbons, in an oxidant-free atmosphere over the heated surface of OCF at the experimental conditions which favor the formation of SCF, according to the following chemical equation:

where: C is carbon; H is hydrogen; E is a chemical element, e.g., O, N, S, P, and others;

M is a product containing the combination of C, H and E, e.g., $CH_4$, CO, $NH_3$, $NO_2$, $H_2S$, $SO_2$, etc.; and, $x \geq 1$, $y \geq 0$, $z \geq 0$, $k \geq 0$.

The growth of SCF over the heated (resistively or by microwave energy, or other means of heating) surface of OCF occurs at elevated temperatures (600-2000° C.) without use of special metal catalysts. The nature of nucleation sites for filaments growth is yet to be understood. SCF produced are predominantly straight and vary in the length and thickness depending on the nature of CG, temperature, residence time and the presence of additives to CG. If necessary, TCF can be grown on the surface of SCF. The basic chemical equation governing the growth of TCF from CG is the same as the one pertaining to the growth of SCF (equation 1). However, the experimental conditions for the growth of TCF are quite different from that of SCF, in that, they require the use of special metal catalyst particles, the lower temperature range, and in some cases, the presence of an additive gas. It was found that the efficient metal catalyst particles contain such metals as Ni, Fe, Co, Cu, Mo or their combination, and the optimum temperature range for the growth of TCF is within 500-1200° C. The addition of hydrogen gas to CG (at the ratio from 0.1:1 to 1:1 by volume) in many cases increases the yield of TCF. It appears that the growth of secondary and tertiary carbon filaments on the surface of primary carbon fibers would result in the increase in the total surface area by 2-4 orders of magnitude (compared to the surface of primary carbon fibers).

A substantial increase in the surface area of 3D carbon fibers is realized by adding an activation step, preferably, after the growth of SCF. The objective of the activation step is to generate the system of nano- and micropores within 3D carbon fibers, thus, dramatically increasing the total surface area. The surface area of the resulting filamentous carbon structure is potentially one-two orders of magnitude higher than that of the conventional active carbon fibers. The activation step comprises the reaction of surface carbon with the activating gases, such as steam, carbon dioxide, or their mixture, according to the following equations:

In principle, the surface area of 3D carbon fibers can be increased via chemical activation procedure using special activating agents, such as, $ZnCl_2$, KOH, $H_3PO_4$ and others. The presence of SCF and TCF on the surface of OCF allows one to significantly increase the total surface area of the carbon structure and protect OCF from the excessive damage which the activating gases may cause to OCF.

Figure 2:
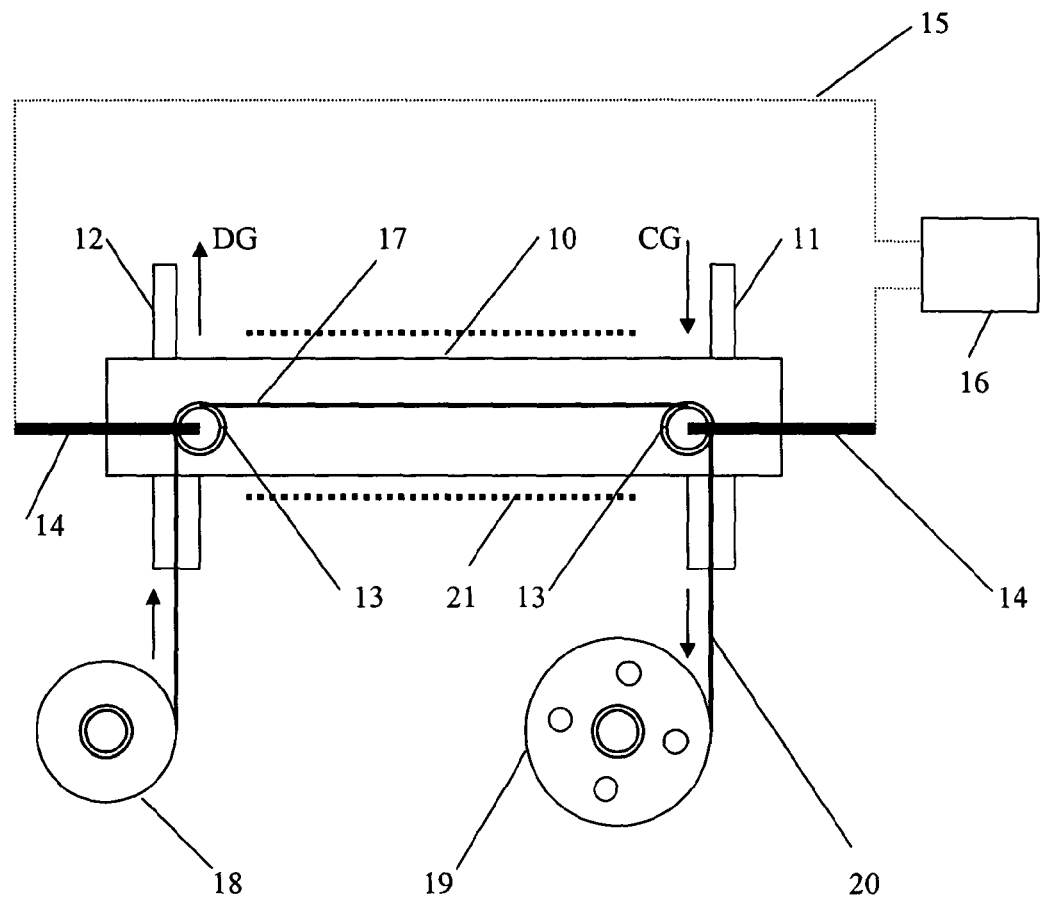
FIG. 2 is a schematic diagram of the preferred embodiment of the apparatus for producing secondary carbon filaments (SCF).

Refer now to FIG. 2 which presents a schematic representation of a preferred embodiment of the apparatus for producing 3D carbon fibers (limited to the growth of SCF). Thermal decomposition of CG takes place in a preferably cylindrical (or any other shape) reaction chamber 10 made of preferably quartz, or ceramic, (or any other temperature resistant material) over the surface of heated OCF 17 in an oxidant-free atmosphere. OCF is heated, preferably by passing electrical current through it (or by microwave energy, or any other means of heating OCF to the necessary temperature), via graphite rods 14 using electric wires 15 and a source of electric power 16 (AC or DC). Carbonaceous gas (or carbonaceous vapor, if the carbon-containing compound is a liquid at room temperature) is introduced into the reaction chamber 10 via inlet 11, and the gaseous products of CG thermal decomposition (decomposition gases DG) exit the chamber via an exit 12. OCF 17 is stretched between two graphite rollers 13. During the continuous process, OCF 17 is supplied from a spool 18 into the reaction chamber 10, where the deposition of SCF onto the surface of OCF 17 occurs, and the resulting 3D carbon fiber 20 exits the chamber and is wound on a take-up reel 19. An insulation 21 can be optionally used to prevent excessive heat losses from the system.

The thickness and the length of SCF could be controlled by the following variables: (i) the nature of CG used; (ii) the temperature of the OCF surface (which can be controlled by the electric current passed through OCF); (iii) the CG residence time in the reaction chamber; and, (iv) the diameter of the reaction chamber (or distance from the OCF to the chamber wall). It was found that the growth of SCF is accompanied by the deposition of carbon (pyrocarbon) onto the surface of OCF. As a result, OCF is covered by the protective carbon layer, although, at the expense of loosing some of its original flexibility.

Figure 3:
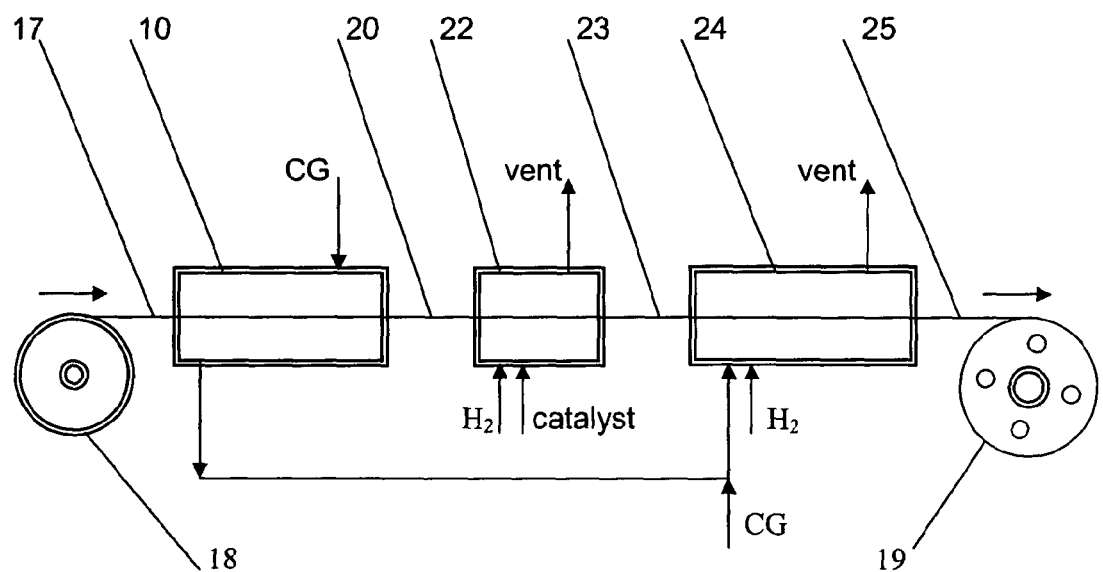
FIG. 3 is a schematic diagram of the preferred embodiment of the apparatus for producing tertiary carbon fiber (TCF) grown on SCF.

FIG. 3 depicts a schematic diagram of another preferred embodiment of the apparatus for the production of 3D carbon fibers comprising of SCF and TCF grown on the surface of OCF. SCF 20 are grown on OCF surface in the reaction chamber 10 as discussed above. The OCF with SCF 20 on its surface enters the second reaction chamber 22 where metal catalyst particles are deposited on the surface of SCF/OCF. The metal catalyst precursor could be any inorganic or metal-organic compounds containing transition metals such as Fe, Ni, Co, Cu, Mo, or their combinations. The examples of catalyst precursors include, but not limited to, $Ni(NO_3)_2$, $Ni(CH_3COO)_2$, $Fe(NO_3)_3$, $Fe(CO)_5$, $Co(NO_3)_2$, the mixture of $Ni(NO_3)_2$—$Cu(NO_3)_2$, etc. Metal catalyst precursors are deposited and then decomposed over the hot surface SCF/OCF and finally converted into the catalytically active form in the presence of a reducing gas (e.g., $H_2$). The OCF/SCF 23 with the metal catalyst particles (in active form) deposited on their surface enters the reaction chamber 24 where growth of TCF over SCF/OCF occurs via thermal decomposition (at 500-1200° C.) of the mixture of the fresh CG and the gas exiting the reaction chamber 10 (which usually contains significant amount of $H_2$). If necessary, the additional amount of $H_2$ could be added to the stream entering the reaction chamber 24. The 3D carbon fibers 25 comprising of OCF covered with SCF and TCF exit the reaction chamber 24 and is wound on the take-up reel 19.

Figure 4:
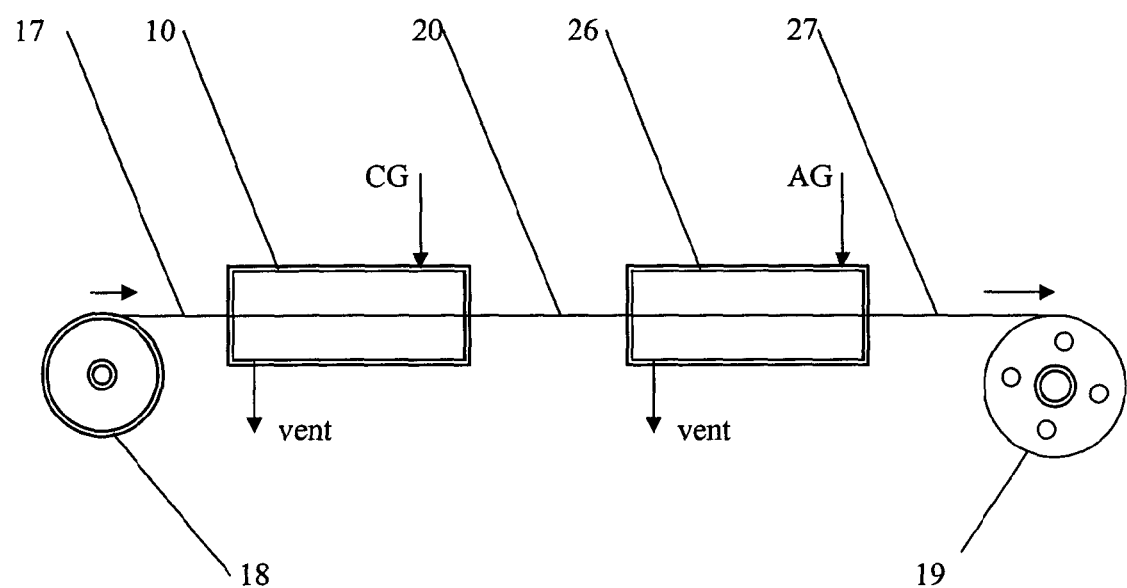
FIG. 4 is a schematic diagram of the preferred embodiment of the apparatus for producing 3D activated carbon fibers

FIG. 4 refers to the block-diagram of the preferred embodiment of the apparatus for producing 3D activated carbon fibers (ACF). The OCF/SCF 20 produced in the reaction chamber 10 (as discussed above) enters the reaction chamber 26 where the activation of OCF/SCF occurs via its treatment with activating gases (AG) at 700-1200° C. Steam, $CO_2$ or their combination can be used as AG. At this stage, the addition of different activating agents, such as KOH, $ZnCl_2$, $H_3PO_4$, for increasing the efficiency of the activating process, could be advantageous. The resulting 3D activated carbon fiber 27 is wound on the take-up reel 19.

The following examples demonstrate the features of and unique products provided by the present invention.

EXAMPLE 1

3D carbon fibers were obtained by thermal decomposition of propane over OCF resistively heated to 1100° C. The exposure time: 5 min. Hereafter we used a commercial carbon yarn with the purity of 99.96% and the diameter of 0.6 mm, and graphite rods with the purity of 99.9995% and the diameter of 3.05 mm. Before the experiments the cylindrical quartz reactor was purged with the inert gas (Ar), and the carbon fiber was resistively heated to approximately 650° C. to desorb and decompose all the gases and organic compounds present on its surface. This was followed by the introduction of propane into the reaction chamber where it decomposed over the surface of resistively heated carbon fiber. The carbon fiber with carbon filaments grown on its surface was carefully removed from the reactor and analyzed by SEM method.

Figure 5:
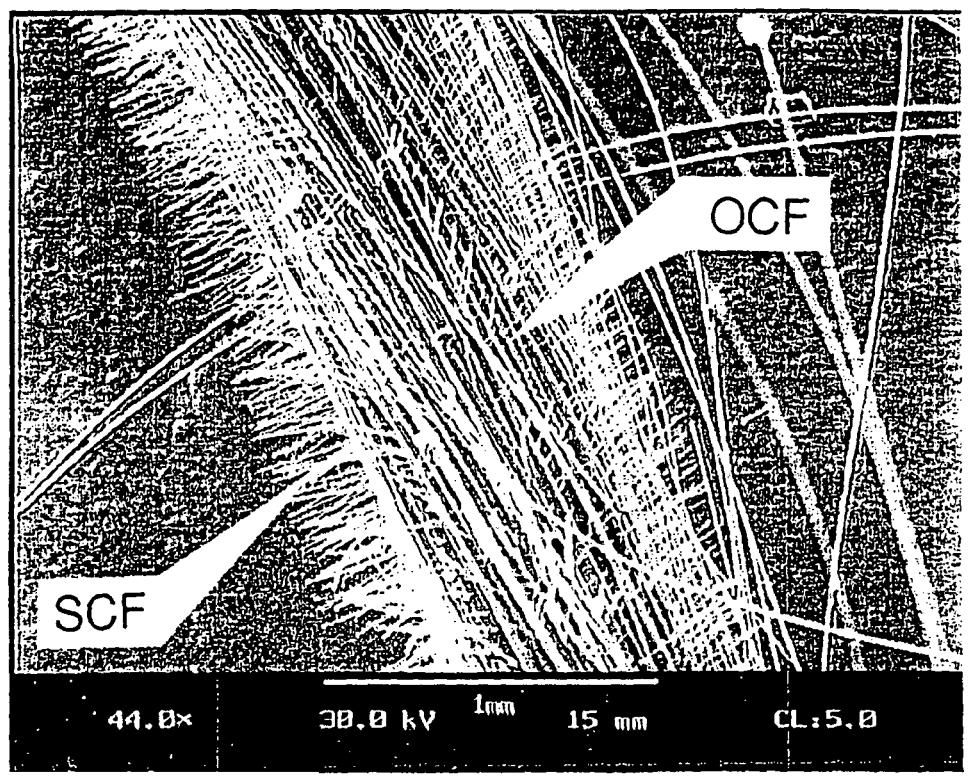
FIG. 5 illustrates a SEM image of 3D carbon fibers consisting of SCF grown on OCF by thermal decomposition of propane at 1100° C.
Figure 6:
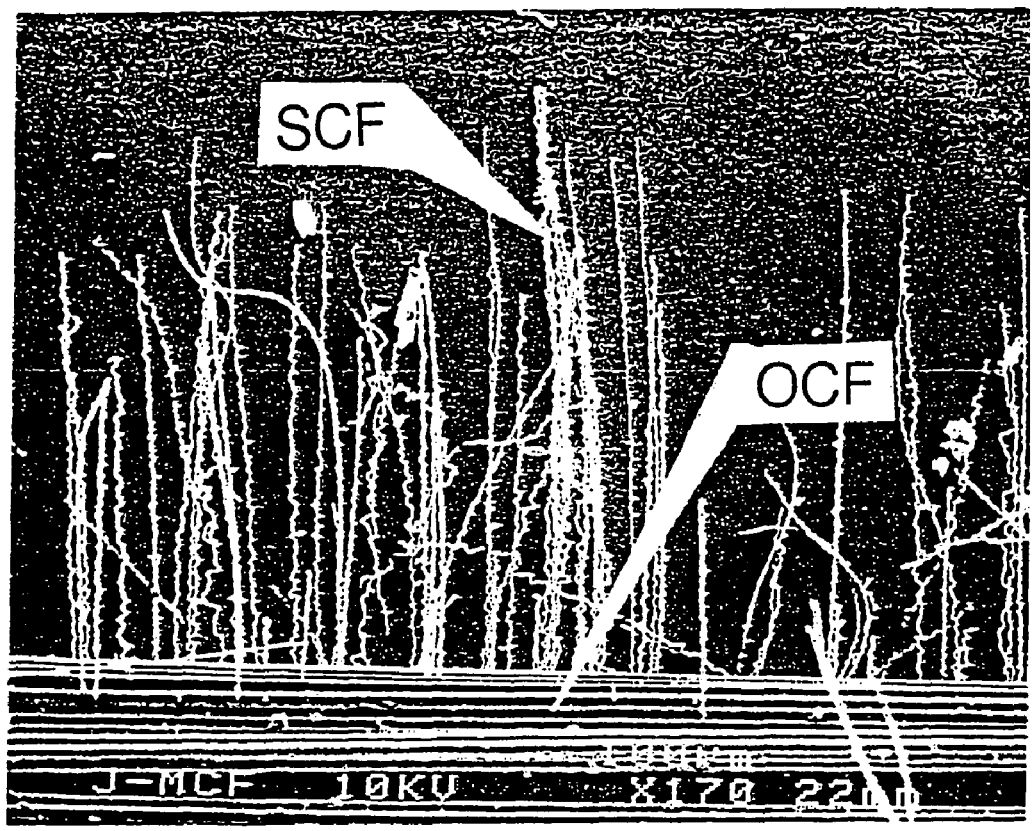
FIG. 6 shows a SEM image (at larger magnification) of 3D carbon fibers consisting of SCF grown on OCF by thermal decomposition of propane at 1100° C.

FIGS. 5 and 6 demonstrate SEM images of the 3D carbon fibers obtained. These images feature SCF grown in the form of nearly straight filaments on the surface of OCF. The average diameter of the filaments is approximately 1 µm, and the length is approximately 200-300 µm.

EXAMPLE 2

Figure 7:
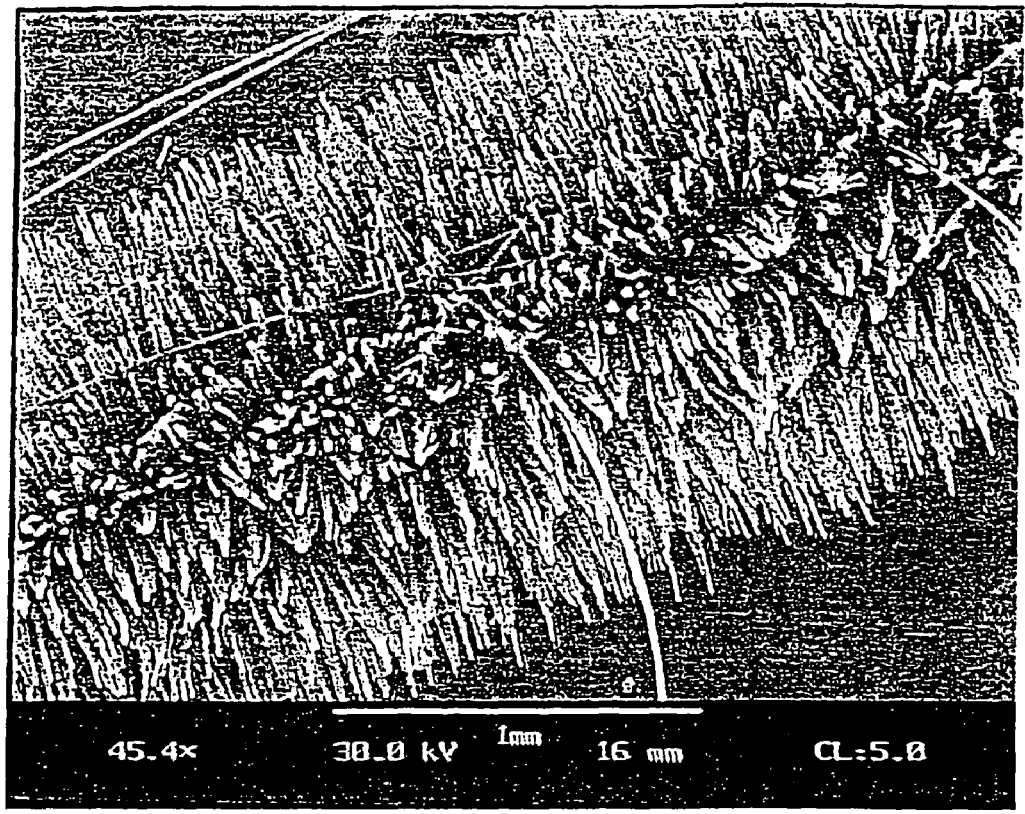
FIG. 7 depicts SEM images of 3D carbon fibers consisting of OCF covered by SCF produced by decomposition of propane at 1200° C.

FIG. 7 depicts the SEM image of 3D carbon fibers comprised of OCF covered by SCF produced by decomposition of propane at 1200° C. The exposure time: 7 min. The density of SCF on the surface of OCF is higher than that found in the Example 1. The average SCF diameter is in the range of 10-20 µm and the average length 400-500 µm.

EXAMPLE 3

Figure 8:
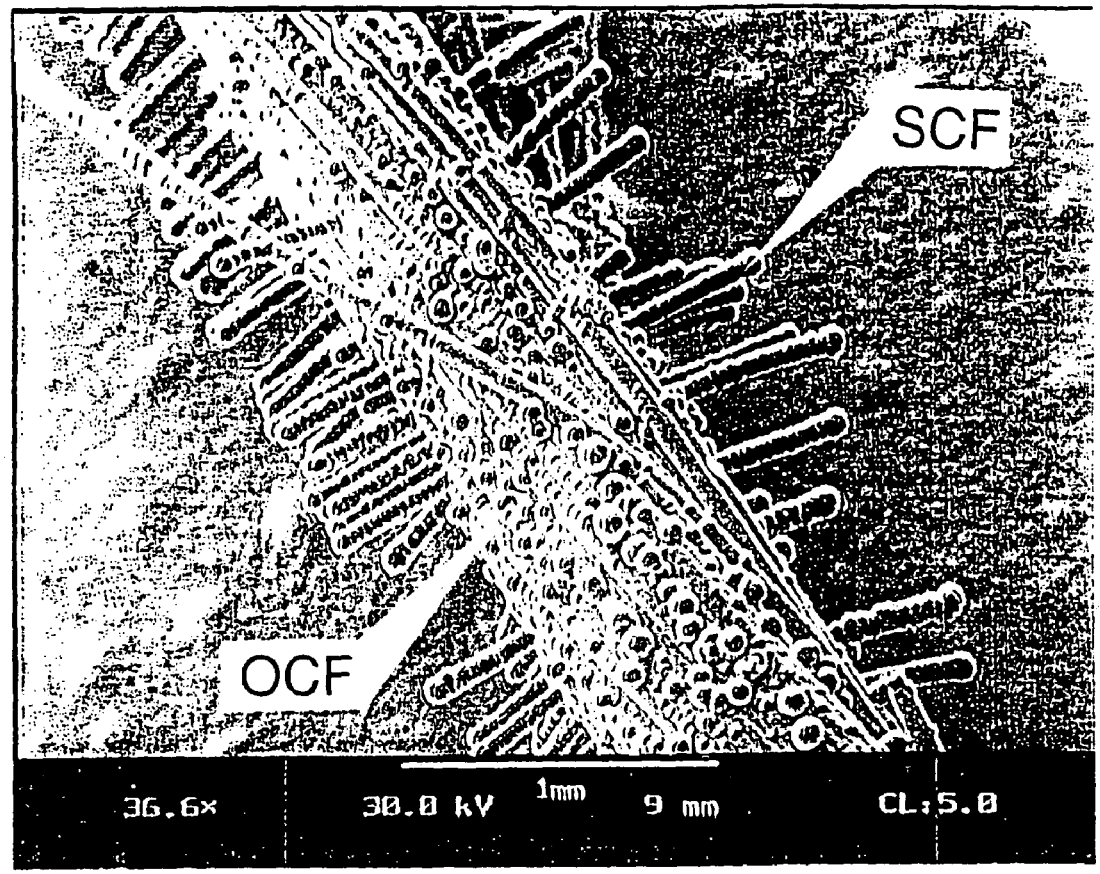
FIG. 8 shows a SEM image of OCF with SCF grown on its surface by thermal decomposition of propane at 1300° C.

FIG. 8 shows the SEM image of OCF with SCF grown on its surface by thermal decomposition of propane at 1300° C. and an exposure time of 10 min. It is clear that the higher temperatures and the longer residence times resulted in growth of thicker SCF. The SCF diameter varies in the range of 50-100 µm, and the average length is 400 µm. It is noteworthy that the SCF grow in the form of thick straight filaments with rounded edges. One can see the nodules on the surface of OCF which are apparently the precursors for SCF growth.

EXAMPLE 4

Figure 9:
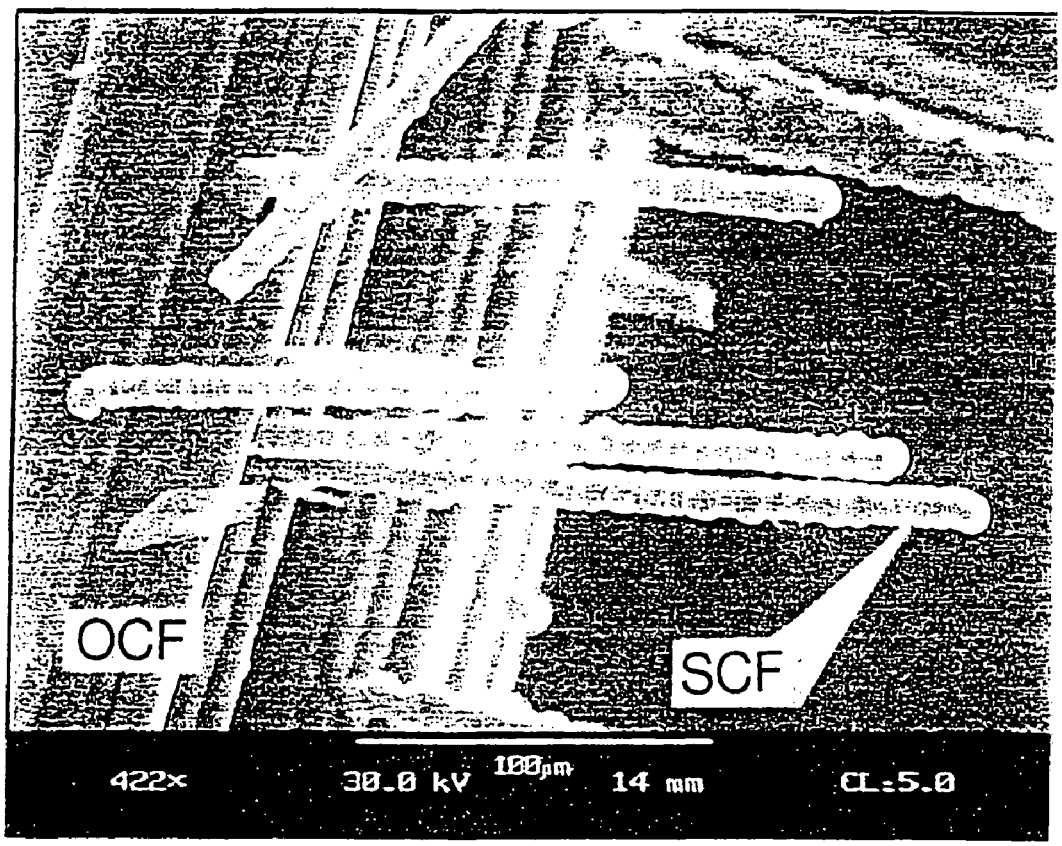
FIG. 9 depicts SEM images of SCF produced by decomposition of ethylene over OCF at 1200° C.

FIG. 9 depicts the SEM image of SCF produced by decomposition of ethylene over OCF at 1200° C. and 5 min of an exposure time. These filaments are straight and feature the average diameter of 10 µm and length of 200 µm.

EXAMPLE 5

Figure 10:
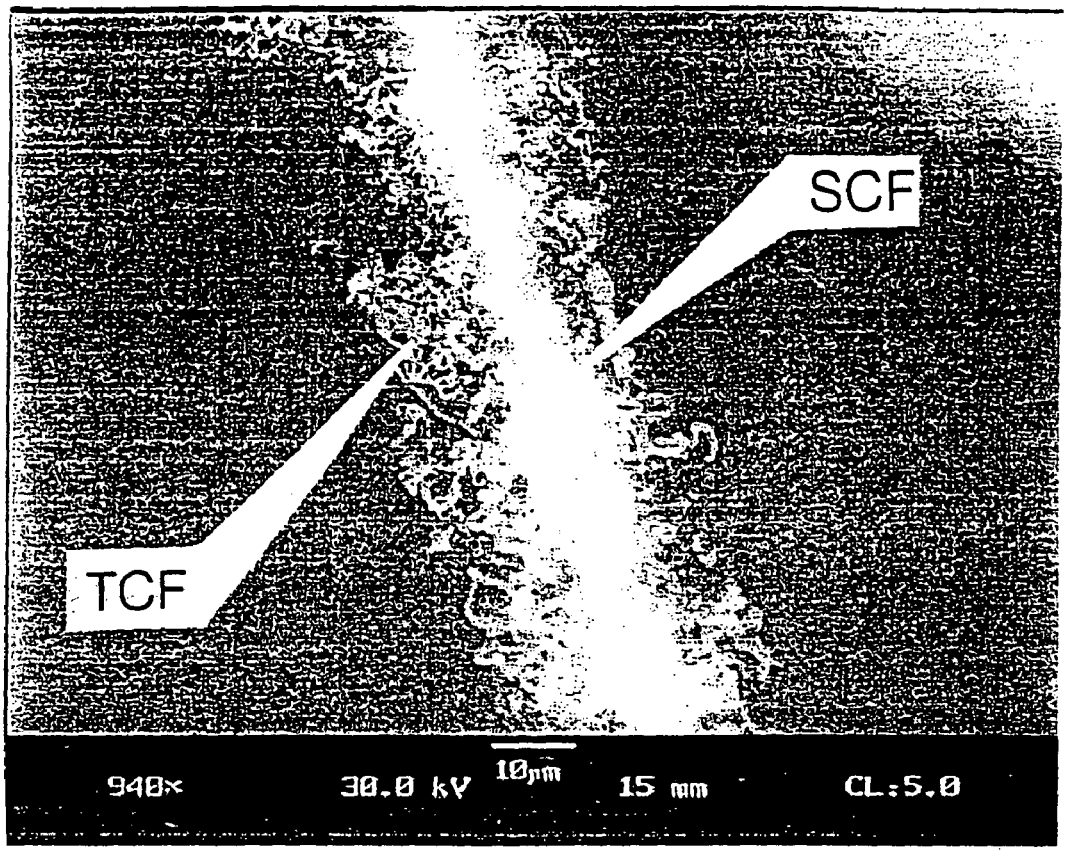
FIG. 10 shows a SEM image of TCF grown on the surface of an individual SCF in the presence of Ni catalyst particles by decomposition of ethylene at 650° C.
Figure 11:
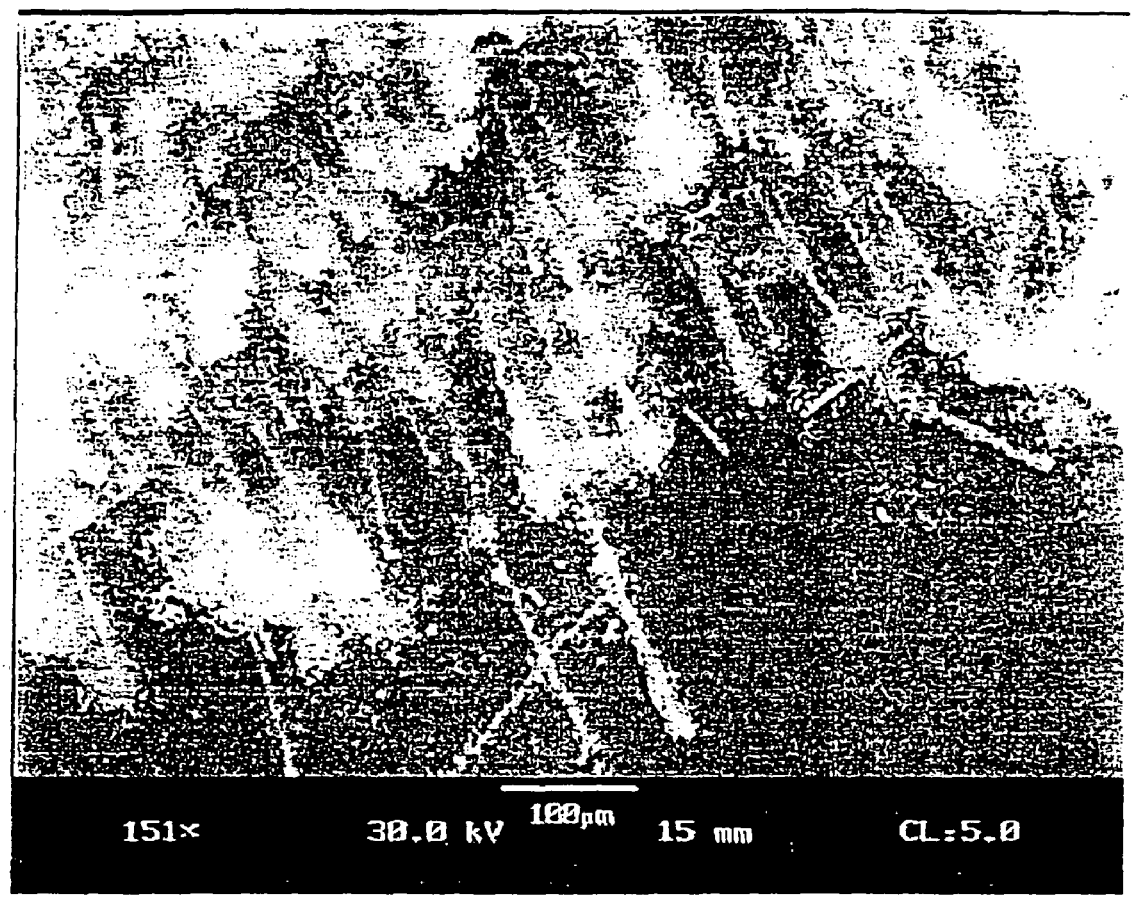
FIG. 11 shows a SEM image of the bunch of SCF covered by TCF catalytically grown on the surface of SCF from ethylene using Ni-catalyst (at 650° C.).

In this experiment tertiary carbon filaments (TCF) were grown on the surface of secondary carbon filaments (SCF). SCF were produced by thermal decomposition of ethylene at 1000° C. and exposure time of 10 min. Ni catalyst particles were deposited on the surface of SCF by soaking fibers in $Ni(NO_3)_2$ solutions followed by drying (200° C.), then thermal treatment in Ar atmosphere (650° C., 1 hr) and subsequent reduction in the flow of hydrogen (650° C., 1.5 hr). The carbon filaments with Ni catalyst particles on their surface (approx. 2% by weight) were subjected to the gaseous mixture of $C_2H_4$—$H_2$ (50-50% by volume) at 650° C. for 0.5 hr. As a result, the tertiary carbon filaments grew on the surface of SCF. FIGS. 10 and 11 show the SEM images of TCF grown on the surface of SCF. The diameter of TCF is in the range of 0.2-1 µm, and the length of approximately 10-20 µm. It is evident that TCF are predominantly curly.

EXAMPLE 6

Figure 12:
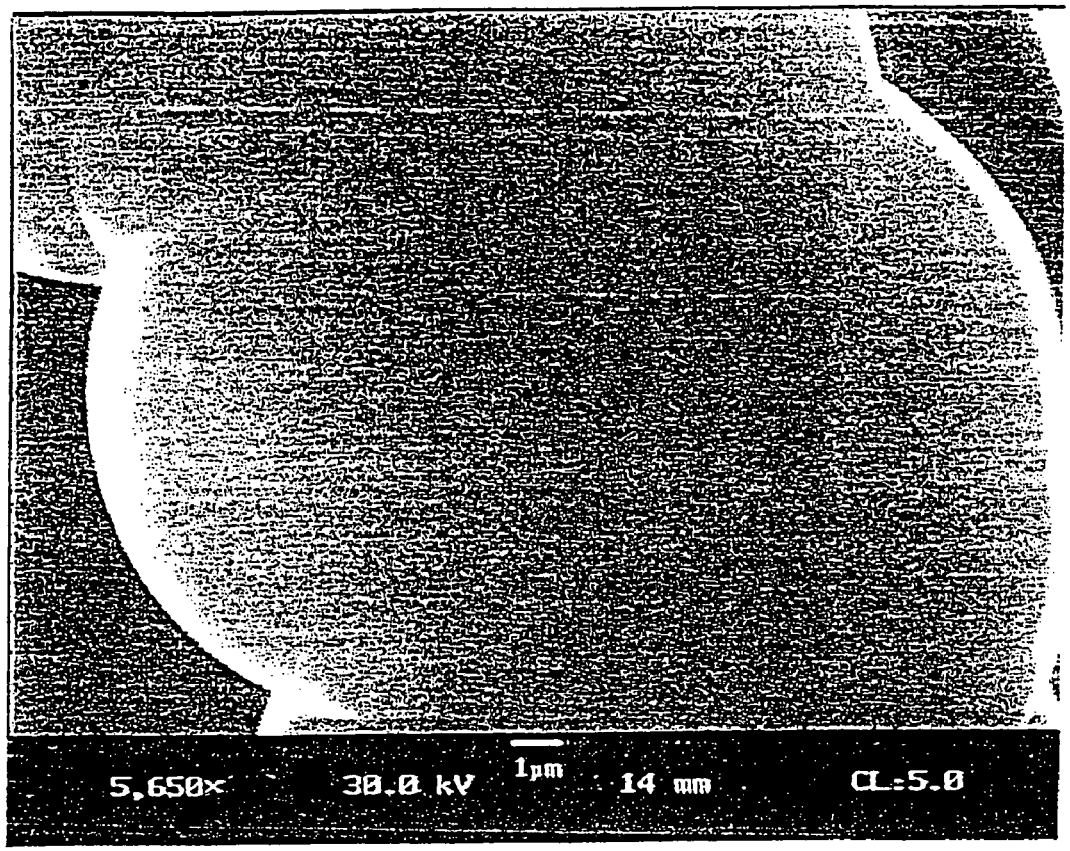
FIG. 12 depicts a SEM image of the SCF surface before steam activation.
Figure 13:
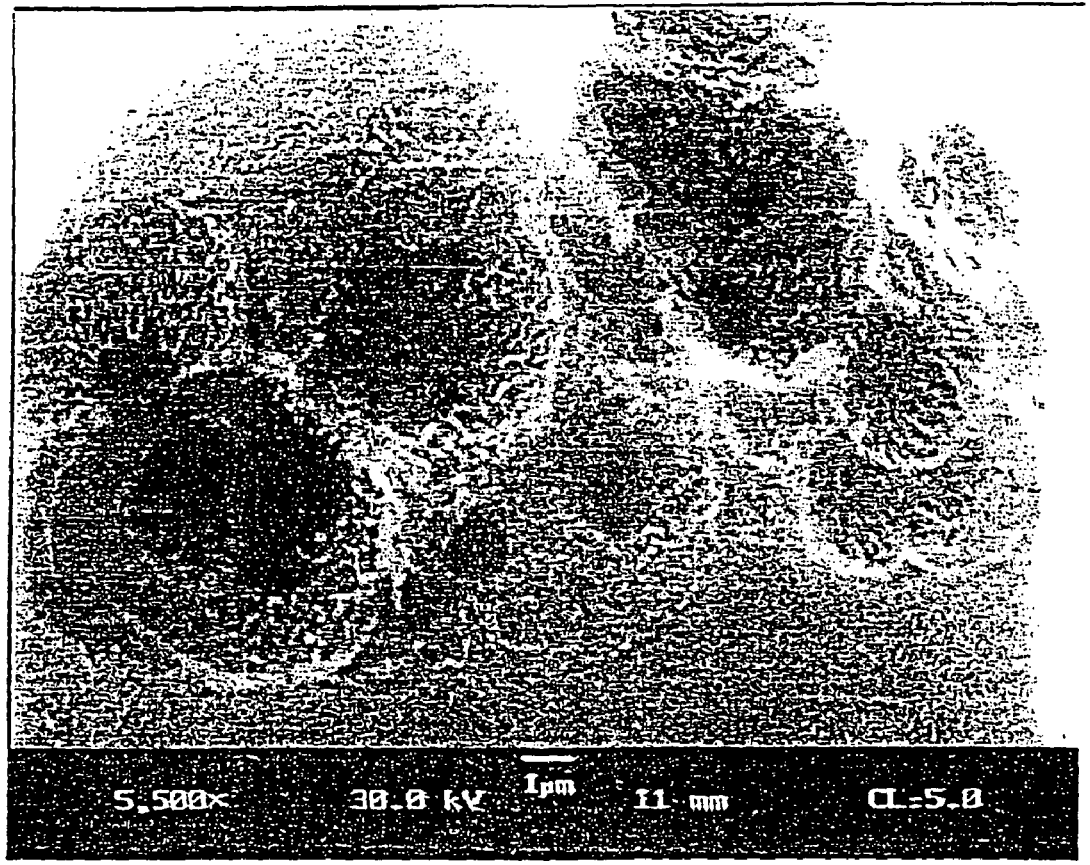
FIG. 13 illustrates a SEM image of the SCF surface after steam activation at 900° C.

The experiments described in this example are concerned with the activation of SCF with steam. FIGS. 12 and 13 depict the SEM images of the surface of relatively thick SCF (produced by thermal decomposition of propane) before and after steam activation at 900° C. for 1 hr. It is evident that the steam treatment of the originally smooth surface of SCF resulted in the formation of small and large pores which provides increased surface area.

The advantages of the present invention are summarized as follows:
1) The invention provides a novel three-dimensional carbon fiber structure with high surface area;
2) the method for producing 3D carbon fibers by growing SCF and TCF on OCF is relatively simple, and it can be arranged in a continuous process;
3) the thickness and the length of SCF and TCF can be easily controlled by the variation of the operational parameters, e.g. the temperature, the CG residence time, the presence of additives, and others;
4) the method for production of 3D carbon fibers and ACF (limited to SCF) is not sensitive to the presence of small amounts of sulfur and other contaminants, thus, inexpensive industrial grade CG can be used in the process;
5) the growth of SCF and TCF does not produce any chemical changes in OCF;
6) 3D carbon fibers with straight and thick SCF can efficiently bind with the metal, ceramic, glass, and concrete matrices due to strong micromechanical interaction; and,
7) the method allows to simultaneously cover OCF with a protective carbon coating, which can prevent any possible damage (both, chemical and mechanical) to the fiber during production of composite materials (particularly, corrosive attack by the ceramic and metal matrices).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for the production of three-dimensional (3D) carbon fiber structures having an original carbon fiber (OCF) covered with a network of secondary carbon fibers (SCF) comprising the steps of:
    (a) selecting an original carbon fiber (OCF) having a surface with nucleation sites for filament growth a metal weight content of less than approximately 100 parts per million;
    (b) heating the surface of the original carbon fiber (OCF) to temperatures from approximately 600° C. to approximately 2000° C.;
    (c) thermally decomposing a carbonaceous gas without an additional metal catalyst in an oxidant-free atmosphere over the surface of the heated original carbon fiber (OCF); and,
    (d) recovering original carbon fiber (OCF) with a network of straight secondary carbon fibers (SCF) grown as branches on the OCF surface without the addition of a metal catalyst, thereby realizing three-dimensional (3D) carbon fibers, wherein the straight secondary carbon fiber (SCF) has a thickness of from approximately 1 μm to approximately 100 μm and a length of from approximately 1 μm to approximately 1 cm.

2. The method according to claim 1 wherein said carbonaceous gas is an aliphatic hydrocarbon compound.

3. The method according to claim 2 wherein said aliphatic hydrocarbon is propane.

4. The method of claim 3, wherein the heating of the surface of the original carbon fiber (OCF) is to a temperature of approximately 1200° C. for an exposure time of approximately 7 minutes.

5. The method of claim 4, wherein the secondary carbon fiber (SCF) grown on the surface of the original carbon fiber (OCF) has an average diameter in the range of approximately 10-20 μm and an average length of approximately 400 μm to approximately 500 μm.

6. The method of claim 3, wherein the heating of the surface of the original carbon fiber (OCF) is to a temperature of approximately 1300° C. for an exposure time of approximately 10 minutes.

7. The method of claim 6, wherein the secondary carbon fiber (SCF) grown on the surface of the original carbon fiber (OCF) has an average diameter in the range of approximately 50-100 μm and an average length of approximately 400 μm.

8. The method according to claim 2 wherein said aliphatic hydrocarbon is methane.

9. The method according to claim 2 wherein said aliphatic hydrocarbon is ethylene.

10. The method of claim 9, wherein the heating of the surface of the original carbon fiber (OCF) is to a temperature of approximately 1200° C. for an exposure time of approximately 5 minutes.

11. The method of claim 10, wherein the secondary carbon fiber (SCF) grown on the surface of the original carbon fiber (OCF) has an average diameter of approximately 10 μm and an average length of approximately 200 μm.

12. A method of the production of three-dimensional (3D) carbon fibers according to claim 1 comprising the further step of activating the recovered 3D carbon fibers containing SCF by exposure to steam.

13. A method of the production of three-dimensional (3D) carbon fibers according to claim 1 comprising the further step of activating the recovered 3D carbon fibers containing SCF by exposure to carbon dioxide.

14. The method of claim 1, wherein the heating of the surface of the original carbon fiber (OCF) is by resistive heating in a temperature range from approximately 650° C. to approximately 1100° C.

15. The method of claim 14, wherein the secondary carbon fiber (SCF) grown on the surface of the original carbon fiber (OCF) has an average diameter of approximately 1 μm and a length of approximately 200 μm to approximately 300 μm.

16. A method for the production of three dimensional (3D) carbon fiber structures having an original carbon fiber (OCF) covered with a network of secondary carbon filaments and the network of secondary carbon filaments covered with a network of tertiary carbon filaments comprising the steps of:
    (a) selecting an original carbon fiber (OCF) having a surface with nucleation sites for filament growth and a metal weight content of less than approximately 100 parts per million;
    (b) heating the surface of the original carbon fiber (OCF) to temperatures from approximately 600° C. to approximately 2000° C.;
    (c) thermally decomposing a carbonaceous gas without an additional metal catalyst in an oxidant-free atmosphere over the surface of the heated original carbon fiber (OCF); and,
    (d) recovering original carbon fiber (OCF) with a network of straight secondary carbon fiber (SCF) grown as branches on the OCF surface without the addition of a metal catalyst, wherein the straight secondary carbon fiber (SCF) has a thickness of from approximately 1 μm to approximately 100 μm and a length of from approximately 1 μm to approximately 1 cm;

(e) depositing active metal catalyst particles on the surfaces of the recovered secondary carbon fiber (SCF);

(f) heating the surface of the secondary carbon fiber (SCF) with deposited active metal catalyst particles to temperatures from approximately 500° C. to approximately 1200° C.;

(g) thermally decomposing a carbonaceous gas in an oxidant-free atmosphere over the surface of the heated SCF carbon fibers of the foregoing step (f); and (h) recovering 3D carbon fibers having properties of the original carbon fibers (OCF) with a network of straight secondary carbon fibers (SCF) grown on the original carbon fiber (OCF) surface without the addition of a metal catalyst and curly tertiary carbon filaments (TCF) grown as branches on the surface of the straight secondary carbon fibers (SCE) with deposited active metal catalyst particles thereby realizing three-dimensional (3D) carbon fibers having the original carbon fiber (OCF) covered with a network of straight secondary carbon filaments and the network of straight secondary carbon filaments covered with a network of curly tertiary carbon filaments, wherein the tertiary carbon filament has an average diameter in the range of approximately 0.1-1 μm and an average length of from approximately 1 μm to approximately 100 μm.

17. The method according to claim 16 wherein said carbonaceous gas is an aliphatic hydrocarbon.

18. The method according to claim 16 wherein said carbonaceous gas is carbon monoxide.

19. The method according to claim 16 wherein the active metal catalyst particles is deposited on the surface of the secondary carbon fiber (SCF) and is selected from the group consisting of Ni, Fe, Co, Cu, Mo and mixtures thereof.

20. The method of claim 16, wherein the heating of the surface of the secondary carbon fiber (SCF) with active metal catalysts particles deposited on the surface to a temperature of approximately 650° C. for an exposure time of approximately 30 minutes (0.5 hr.).

21. The method of claim 20, wherein the tertiary carbon fiber (TCF) grown on the surface of the secondary carbon fiber (SCF) has an average diameter in the range of approximately 0.2-1 μm and an average length of from approximately 10 μm to approximately 20 μm.

\* \* \* \* \*